United States Patent
Sun et al.

(10) Patent No.: US 8,073,217 B2
(45) Date of Patent: Dec. 6, 2011

(54) STRUCTURE SEGMENTATION VIA MAR-CUT

(75) Inventors: Hui Sun, Philadelphia, PA (US); Sangmin Park, Exton, PA (US); Sarang Lakare, Chester Springs, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 652 days.

(21) Appl. No.: 12/259,322

(22) Filed: Oct. 28, 2008

(65) Prior Publication Data

US 2009/0116709 A1 May 7, 2009

Related U.S. Application Data

(60) Provisional application No. 60/984,474, filed on Nov. 1, 2007.

(51) Int. Cl.
*G06K 9/00* (2006.01)
(52) U.S. Cl. ........................................ 382/128
(58) Field of Classification Search .................. None
See application file for complete search history.

(56) References Cited

U.S. PATENT DOCUMENTS

| | | | | |
|---|---|---|---|---|
| 7,492,968 | B2* | 2/2009 | Jerebko et al. | 382/300 |
| 7,623,709 | B2* | 11/2009 | Gering | 382/173 |
| 2004/0013305 | A1* | 1/2004 | Brandt et al. | 382/224 |
| 2006/0050991 | A1* | 3/2006 | Jerebko et al. | 382/300 |
| 2007/0053589 | A1* | 3/2007 | Gering | 382/173 |
| 2007/0076932 | A1* | 4/2007 | Blumhofer | 382/128 |
| 2007/0263915 | A1* | 11/2007 | Mashiach | 382/130 |
| 2009/0003672 | A1* | 1/2009 | Maier et al. | 382/128 |
| 2011/0103661 | A1* | 5/2011 | Schummers | 382/128 |

FOREIGN PATENT DOCUMENTS

WO 2006/102014 A 9/2006

OTHER PUBLICATIONS

Boykov et al., "Graph cuts and efficient N-D image segmentation", International Jounal of Computer Vision, Kluwer Academic Publishers, Netherlands, vol. 70, No. 2, Nov. 2006, pp. 109-131.
Boykov et al., "Interactive Organ Segmentation Using Graph Cuts", Medical Image Computing and Computer-Assisted Intervention A MICCAI 2000; Springer-Verlag, Berlin/Heidelberg, vol. 1935, Feb. 11, 2004, pp. 276-286.
Shi et al., "Normalized cuts and image segmentation", IEEE Transactions on Pattern Analysis and Machine Intelligence, IEEE Service Center, Los Alamitos, CA, vol. 22, No. 8, Aug. 1, 2000, pp. 888-905.
Boykov et al., "An Experimental Comparison of Min-Cut/Max-Flow Algorithms for Energy Minimization in Vision", IEEE Transactions on Pattern Analysis and Machine Intelligence, IEEE Service Center, Los Alamitos, CA, vol. 26, No. 9, Sep. 1, 2004, pp. 1124-1137.

* cited by examiner

*Primary Examiner* — Jermele M Hollington
(74) *Attorney, Agent, or Firm* — Peter Withstandley

(57) ABSTRACT

A method for segmenting image data includes creating a plurality of marching regions within the medical image data. Region-wise segmentation is performed on the plurality of marching regions. Region-wise segmentation may include a normalized cut performed on a graph wherein each marching region represents a node. Region-wise segmentation may also include or may alternatively include a min cut performed on a graph wherein each marching region represents a node. Voxel-wise segmentation is performed on a subset of the plurality of marching regions.

23 Claims, 7 Drawing Sheets

STRUCTURE SEGMENTATION VIA MAR-CUT

CROSS-REFERENCE TO RELATED APPLICATION

The present application is based on provisional application Ser. No. 60/984,474, filed Nov. 1, 2007, the entire contents of which are herein incorporated by reference.

BACKGROUND OF THE INVENTION

1. Technical Field

The present disclosure relates to segmentation and, more specifically, to structure segmentation via MAR.

2. Discussion of Related Art

Segmentation involves the processing of digital image data to identify two or more distinct objects within the image. In the field of medical imaging, segmentation may be used to differentiate between different anatomical structures such as organs. Segmentation may also be applied to other computer vision problems such as identification of vehicles or people from still or video images.

In the field of medical imaging, segmentation may be particularly useful in identifying suspicious lesions that may be potentially malignant by distinguishing between multiple organs within the medical image so that organ-specific search strategies may be used for identifying suspicious lesions.

Segmentation may be performed on either two-dimensional images such as x-rays or three-dimensional images such as MRIs and CT scans. Prior to performing segmentation, the image data may be in digital form and this can be accomplished by either acquiring the medical image directly into digital form or by digitizing a conventional image. In either case, the resulting digital image data is expressed as a set of pixels (in the case of two-dimensional image data) or voxels (in the case of three-dimensional image data) with varying intensities.

Conventionally, segmentation is performed with extensive manual input, for example, a user such as a radiologist or other medical practitioner, may be prompted to highlight an approximate boundary for a given anatomical structure in one or more two-dimensional image slices and one or more algorithms may be used to ascertain the bounds of the entire anatomical structure. Such segmentation techniques are known to be computationally intensive, and thus may require extensive processing capabilities, long processing times and/or may be prone to errors.

One such technique for performing segmentation involves a growing algorithm where a user first selects a seed point within the structure to be segmented. The selected seed point is understood to be part of the structure and each voxel neighboring the seed point is analyzed for potential inclusion into the structure. If a neighboring voxel satisfies certain predetermined conditions such as having an intensity value close to the one or more voxels already included in the structure or are found not to have characteristics of a boundary, then that neighboring voxel may be added to the structure, and the voxels neighboring that voxel may be analyzed for potential inclusion as well. In this way, the process may be performed recursively until the entire structure is segmented.

Segmentation using growing algorithms, however, may be prone to an error known as "leakage" where voxels that are not truly part of the structure get misidentified as being part of the structure or voxels that are part of the structure get misidentified as being not part of the structure. This sort of error is known as leakage because it can result from a single voxel outside of the structure being misidentified as part of the structure, and then more erroneously characterized voxels may grow from this single voxel. Once the segmentation growth has breached the true boundary between structures, there may be little to stop the growing segmentation from fully encompassing proximate structures.

The extent of leakage may be minimized by taking into consideration prior knowledge such as the approximate size of the structure being segmented so that growth does not occur beyond a predetermined perimeter. However, after leakage has occurred, the user may have to manually adjust the segmentation to ensure that no voxels have been mischaracterized.

SUMMARY

A method for segmenting image data includes creating a plurality of marching regions within the medical image data; performing region-wise segmentation on the plurality of marching regions, and performing voxel-wise segmentation on a subset of the plurality of marching regions.

A first marching region of the plurality of marching regions may be created by prompting a user to identify an initial seed point; receiving a location of the initial seed point from the user; growing the first marching region from the initial seed point using a growing algorithm; and adding boundary points from the first marching region to a seed point candidate queue.

An additional marching region of the plurality of marching regions may be created by selecting a seed point candidate from the seed point candidate queue that is not identified as part of a marching region; growing the additional marching region from the selected seed point candidate using a growing algorithm; and adding boundary points from the additional marching region to the seed point candidate queue.

The region-wise segmentation performed on the plurality of marching regions may include a normalized cut performed on a graph wherein each marching region represents a node. Edges of the graph may connect neighboring marching regions and thickness of the edges may represent an extent to which neighboring marching regions share a boundary area.

The region-wise segmentation performed on the plurality of marching regions may include a region-wise min cut performed on a graph wherein each marching region represents a node. Edges of the graph may connect neighboring marching regions and thickness of the edges may represent an extent to which neighboring marching regions share a boundary area. Source and sink abstract nodes may be added to the graph prior to performing region-wise min cut.

The user may select at least one exterior region from the image data. A growing tree representing the manner in which the marching regions were created may be consulted to ascertain the descendants of the selected exterior region and the selected regions. The descendants of the selected regions and the neighbors of the descendants may be assigned a big edge weight to the source node of the graph for performing the region-wise min cut.

The voxel-wise segmentation performed on the subset of the plurality of marching regions may include a voxel-wise min cut performed on a graph wherein each voxel represents a node.

Edges of the graph may connect neighboring voxels and thickness of the edges may represent extent to which neighboring voxels share a boundary area.

The subset of the plurality of marching regions may include one or more marching regions containing segmentation leakage. Source and sink abstract nodes may be added to the graph prior to performing voxel-wise min cut.

A first marching region of the plurality of marching regions may be created by automatically identifying an initial seed point; growing the first marching region from the initial seed point using a growing algorithm; and adding boundary points from the first marching region to a seed point candidate queue. The initial seed point may be automatically identified using an organ detection algorithm.

An additional marching region of the plurality of marching regions may be created by selecting a seed point candidate from the seed point candidate queue that is not identified as part of a marching region; growing the additional marching region from the selected seed point candidate using a growing algorithm; and adding boundary points from the additional marching region to the seed point candidate queue.

A method for segmenting image data includes creating a plurality of marching regions within the medical image data; performing rough segmentation by applying region-wise segmentation on the plurality of marching regions; and performing fine segmentation on a leakage region of the region-wise segmentation by performing a min cut.

The region-wise segmentation performed on the plurality of marching regions may include performing a normalized cut on a graph wherein each marching region represents a node. Edges of the graph may connect neighboring marching regions and thickness of the edges may represent extent to which neighboring marching regions share a boundary area.

The region-wise segmentation performed on the plurality of marching regions may include performing a region-wise min cut on a graph wherein each marching region represents a node.

A first marching region of the plurality of marching regions may be created by prompting a user to identify an initial seed point; receiving a location of the initial seed point from the user; growing the first marching region from the initial seed point using a growing algorithm; and adding boundary points from the first marching region to a seed point candidate queue.

An additional marching region of the plurality of marching regions may be created by selecting a seed point candidate from the seed point candidate queue that is not identified as part of a marching region; growing the additional marching region from the selected seed point candidate using a growing algorithm; and adding boundary points from the additional marching region to the seed point candidate queue.

A computer system includes a processor and a program storage device readable by the computer system, embodying a program of instructions executable by the processor to perform method steps for segmenting image data. The method includes creating a plurality of marching regions within the medical image data; performing rough segmentation by applying region-wise segmentation on the plurality of marching regions including either a region-wise normalized cut or a region-wise min cut; and performing fine segmentation on a leakage region of the region-wise segmentation by performing a min cut.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF THE DRAWINGS

Figure 1:
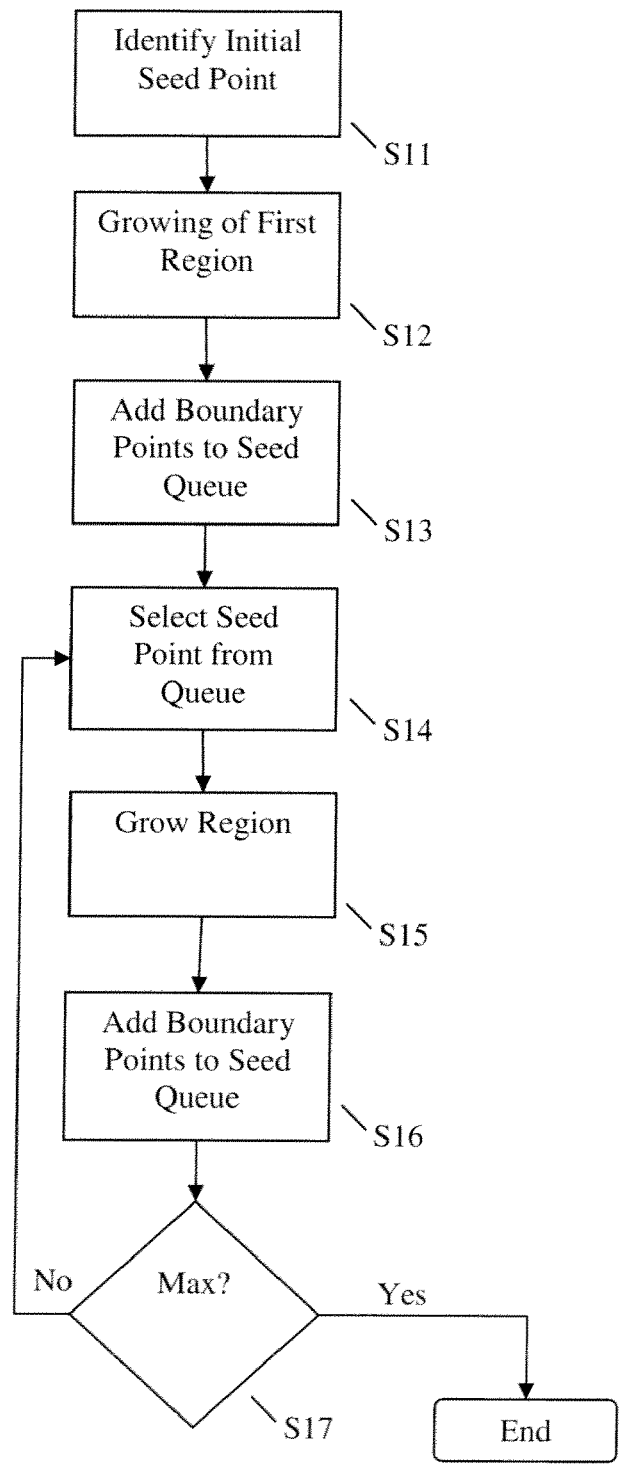
FIG. 1 is a flow chart illustrating a method for creating a plurality of marching regions to be used in segmenting image data according to an exemplary embodiment of the present invention.

In describing exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Exemplary embodiments of the present invention seek to perform segmentation on two-dimensional or three-dimensional image data, for example, medical image data, to identify one or more distinct structures within the image data. Exemplary embodiments of the present invention seek to accomplish this task quickly and accurately while minimizing computational expense and minimizing the need for manual input.

According to exemplary embodiments of the present invention, the segmentation problem may be treated as a graph partitioning problem. Such treatment has been described in *Normalized Cuts and Image Segmentation*, Jianbo Shi and Jitendra Malik, IEEE Transactions on Pattern Analysis and Machine Intelligence (*PAMI*) 2000 ("Shi"), which is incorporated by reference herein. According to this treatment, the image data is treated as a "graph," a collection of vertices (also referred to as nodes) and edges connecting the vertices. The graph may be expressed as G=(V, E) where V represents the vertices (nodes) and E represents the edges between the nodes.

Segmentation may then be performed by partitioning the graph into multiple components by removing or "cutting" various edges that connect the vertices that represent a first component ("A") from the vertices that represent a second component ("B").

As described in Shi, each voxel may be considered to be a single vertex that is connected to the neighboring vertices by an edge, the thickness of which is proportional to the degree of similarity between the connected vertices. However, as the resolution of medical image data continues to increase, partitioning the graph in which each voxel represents a unique vertex can be computationally expensive and slow. Accordingly, exemplary embodiments of the present invention make use of a novel combination of steps that may be faster and computationally less demanding than the approach of Shi. FIG. 1 is a flow chart illustrating a method for creating a plurality of marching regions to be used in segmenting image data according to an exemplary embodiment of the present invention.

First, a user may be prompted to identify an initial seed point (Step S11). The user may be a medical practitioner, for example, a radiologist. The user may be provided with a display of the medical image and may select the seed point by either inputting the coordinates for the seed point, or by selecting the seed point on-screen using a pointing device such as a mouse or a touch-screen. Where the medical image is a three-dimensional medical image, the seed point may be selected from within a two-dimensional image slice that may either be selected by the user or automatically selected by the system. The selection of the desired image slice may be performed, for example, by stepping through a series of two-dimensional image slices.

The user may select the seed point as a point that appears to be within the structure to be segmented. Alternatively, the system may automatically select an appropriate seed point, for example, based on prior knowledge. Where a seed point is automatically selected, the user may be offered the opportunity to accept, reject or change the selected seed point. The initial seed point may be automatically identified, for example, using an organ detection algorithm.

After the initial seed point has been selected, a growing algorithm may be used to identify a first region (Step S12). The growing algorithm, for example, a greedy growing algorithm, may start with the initial seed point as the first region and add to the first region each neighboring voxel that shares a predetermined level of similarity with the initial seed point. The growing step may continue recursively to examine the neighboring voxels of each particular voxel that has been added to the first region to determine if the neighbors are within a predetermined level of similarity to the particular voxels. The recursion may continue until there are no more voxels to add to the first region or until the regions reach a volume limit that is defined by parameters.

It is to be understood that the first region is not the entire structure to be segmented; rather it is a relatively small subsection of the structure. The growing step may be confined to this subsection by setting the predetermined level of similarity to be relatively demanding such that only very similar points may be added to the first region. The determination as to which voxels or pixels are similar may be calculated from the fast marching algorithm.

After the first region is grown (Step S12), the voxels immediately outside of the first region may be added to a queue of seed point candidates (Step S13). Then, a next seed point may be selected from the seed point candidates on the seed point queue (Step S14). A candidate may be used as a seed point only if it has not already been identified as part of a region. A next region may then be grown from the selected next seed point using a growing algorithm (Step S15) and the voxels immediately outside of the next region may be added to the seed point candidate queue (Step S16).

Steps S14 through S16 may be repeated so that a plurality of next regions is grown. These steps may be repeated until a maximum number of regions have been grown (Yes, S17). The maximum number of regions will have been grown when there the entire medical image or a relevant portion thereof is fully divided into non-overlapping regions.

Figure 2:
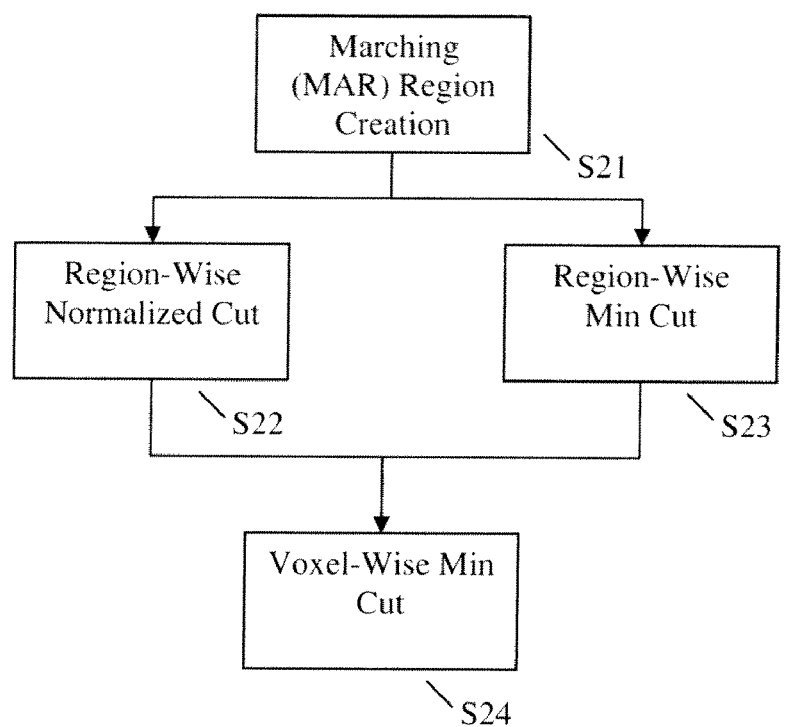
FIG. 2 is a flow chart illustrating a method for segmenting image data according to an exemplary embodiment of the present invention.

FIG. 2 is a flow chart illustrating a method for segmenting image data according to an exemplary embodiment of the present invention. Steps S11 through S17 of FIG. 1 may be considered part of a larger "region creation step" (Step S21). Because the regions are created using a marching algorithm each region is considered a marching region (MAR).

Information pertaining to the plurality of regions and their shared boundary areas may be saves along with the image information. Additionally, the information pertaining to the way in which the plurality of regions was formed may be saved. This information may be considered the "growing tree structure" because it relates to the way the various next regions branched out from the first region.

After the region creation step (Step S21), a region-wise normalized cut may be performed to compute an optimal partition (Step S22). Here, each region formed in the creation step (Step S21) is considered a vertex (node) of a simplified graph, and edges between the vertices indicate which vertices share common boundaries. The weight of each edge may represent the extent to which the vertices share a boundary area. For example, vertices that share a large boundary area may have a heavy weight while vertices that share only a small boundary area may have a light weight. According, vertices that do not share any boundary and are thus non-adjacent may have an edge weight of zero.

A normalized cut, as performed in Shi is a voxel-wise normalized cut. This means that each voxel is considered to be an independent node. However, here, the normalized cut is a region-wise normalized cut where each of the plurality of grown regions is considered to be a node.

In graph theory, a cut is a representation of the total similarity between two disjoint sets A and B such that:

$$\text{cut}(A, B) = \sum_{u \in A, v \in B} w(u, v) \quad (1)$$

where $w(u,v)$ is the weight of the edge between the u node and the v node.

The normalized cut (Ncut) is a way of partitioning the graph into disjoint sets where by some measure, the similarity among vertices of the same set is high while the similarity among vertices of different sets is low. The normalized cut computes the cut cost as a fraction of the total edge connections to all the nodes in the graph as follows:

$$N\text{cut}(A, B) = \frac{\text{cut}(A, B)}{\text{assoc}(A, V)} + \frac{\text{cut}(A, B)}{\text{assoc}(B, V)} \quad (2)$$

where $\text{assoc}(A,V)$ is the total edge weight from each node within the set A to all of the nodes in the graph:

$$\text{assoc}(A, V) = \sum_{u \in A, t \in V} w(u, t) \quad (3)$$

and where $\text{assoc}(B,V)$ is the total edge weight from each node within the set B to all of the nodes in the graph:

$$\text{assoc}(B, V) = \sum_{u \in B, t \in V} w(u, t) \quad (4)$$

Accordingly, the normalized cut may be performed on the marching regions to compute the optimal area of partition (Step S22). The result of the partition is to have a first group of marching regions that includes the initial seed point and a second group of marching regions that does not include the initial seed point. This second group of marching regions may be characterized as the leakage section.

As an alternative to performing the region-wise normalized cut, or in addition to it, a region-wise min cut may be performed to partition the graph and identify a leakage section (Step S23). The purpose of the minimum cut, or min cut, is to find the cut of the graph that has the smallest cut cost. Determination of the min cut is described in detail in *An Experimental Comparison of Min-Cut/Max-Flow Algorithms for Energy Minimization in Vision*, Yuri Boykov and Vladimir Kolmogorov, *IEEE Transactions on Pattern Analysis and Machine Intelligence* (PAMI), 26(9):1124-1137, September 2004 ("Boykov"), which is incorporated herein by reference.

As is the case for the region-wise normalization cut, the region-wise min cut is applied to the marching regions, for example in the manner described below. It is this application of the min cut to the marching region rather than to each voxel independently that renders the min cut a "region-wise" min cut rather than a "pixel-wise" min cut.

According to exemplary embodiments of the present invention, two abstract nodes may be added to the region-wise graph. The first abstract node may be a "source" and the second abstract node may be a "sink." The source node may be connected to a certain number of marching regions with edges having big weights. The number of marching regions that the source node is connected to may be adjustable by the user, but may be a predetermined number for example, 5% of the total marching regions in the graph. The source node should include the initial seed point. The big edge weight may be the biggest possible edge weight that can be expressed based on the quantity of memory available to store the weight value. For example, an 8-byte or double-precision space may be used to store each edge weight and in this case, the big edge weight may be the largest possible number that may be stored in the 8-byte or double-precision space.

After the source and sink nodes have been created, the user may be asked to select at least one exterior region. The exterior regions may be regions that are known by the user to be beyond the structure to be segmented. The growing tree that represents the manner in which the marching regions were created may be consulted to ascertain the descendants of the selected region. Then, the selected regions, the descendants of the selected regions and the neighbors of the descendants may be assigned a big weight to the source node.

Thereafter, the min cut or the normalized cut may be applied to the graph between the source node and the sink node to separate the leakage region. To calculate the min cut, the cut (for example, as defined above with respect to equation (1)) that has a minimum cost among all possible cuts is determined and labeled as the min cut. The min cut may be calculated as a minimization problem, for example, in accordance with techniques described in detail in Boykov. Once identified, the edge values of the determined min cut may be zeroed thereby separating the graph into two independent regions, with the region including the sink node being characterized as the leakage region.

The graph may have more than one region of leakage, and accordingly, the min cut procedure of Step S23 may be repeated for each area of leakage. Repetition may be automatically performed or may be initiated manually by the user.

After one or more leakage regions have been identified in steps S22 and/or S23, a voxel-wise min cut may be performed within each region of leakage (Step S24). The voxel-wise min cut may be limited to the one or more marching regions identified as the regions of leakage so that a voxel-wise min cut does not have to be performed on the entire image volume. As the one or more marching regions may be relatively small in comparison to the entire image volume, segmentation may be substantially sped up by limiting the voxel-wise min cut to the regions of leakage.

Voxel-wise min cut may be performed on a graph in which each voxel represents a node and the edge between adjacent nodes may be set as one while the edges between non-adjacent nodes may be set as zero. As was seen above, the source and sink abstract nodes may be added to the voxel-wise graph. A first location may be identified as belonging to a "structure of interest" and a second location may be identified as belonging to "leakage." These identifications may be performed either by automatic identification or by manual input provided by the user.

After the identifications have been made, voxels that neighbor the identified structure of interest may be assigned edges with big weight to the source while voxels that neighbor the identified leakage may be assigned edges with big weight to the sink. The voxel-wise min cut may then be performed in the graph of voxels between the source and sink nodes. The leakage marching regions may then be separated by zeroing the edges along the identified min-cut area, thereby completing the segmentation.

Accordingly, the combination of the marching region-wise segmentation followed by the voxel-wise min cut may act as a fast cutting step and a fine adjustment step, respectively. Thus segmentation may be performed with the same precision of a fully voxel-wise approach but with significantly greater computational efficiency.

Figure 3:
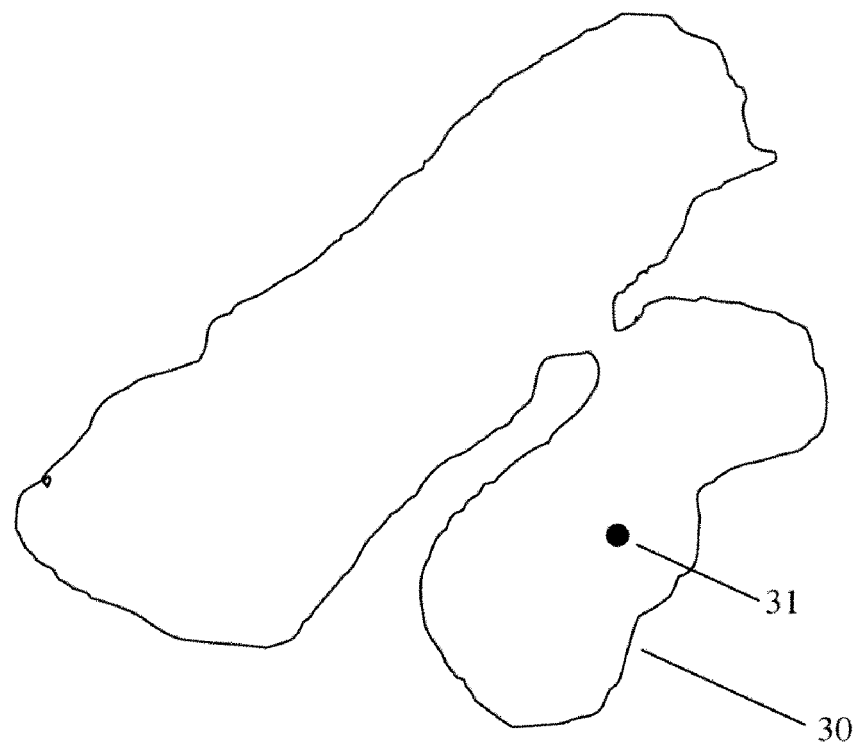
FIG. 3 is an illustration of an image to be segmented according to an exemplary embodiment of the present invention.

FIGS. 3 through 6 illustrate sample segmentation according to an exemplary embodiment of the present invention. FIG. 3 is an illustration of an image to be segmented according to an exemplary embodiment of the present invention. The image 30 is shown as a two-dimensional image although it is understood that the image may in fact be a three-dimensional image. The initial seed point 31 is illustrated within the image 30.

Figure 4:
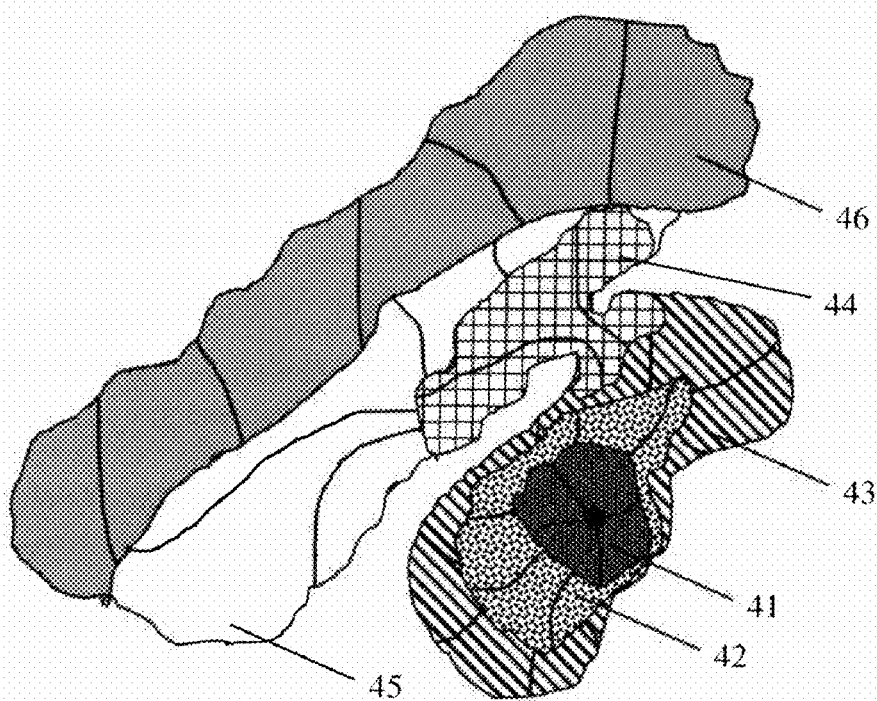
FIG. 4 is an illustration of the image of FIG. 3 after marching region creation.

FIG. 4 is an illustration of the image of FIG. 3 after marching region creation (Step S21). The illustration includes a set of first marching regions 41, a set of second marching regions 42, a set of third marching regions 43, a set of fourth marching regions 44, a set of fifth marching regions 45, and a set of sixth marching regions 46. Each set of marching regions is illustrated in FIG. 2 with a distinct shading, however, as can be seen, each set of marching regions may include multiple marching regions. Again, although the marching regions are shown in two-dimensions, it is to be understood that the marching regions may be three-dimensional where the image data is also three-dimensional. Here only six sets of marching regions are illustrated for the benefit of illustration, however, there may be more sets of marching regions and each set of marching regions may include more marching regions.

Figure 5:
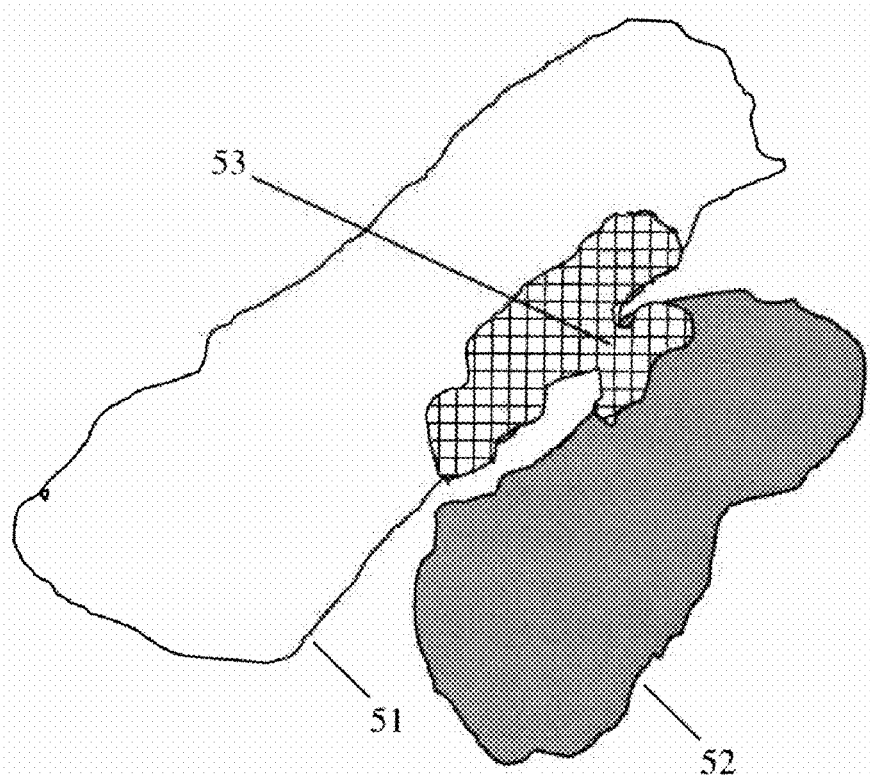
FIG. 5 is an illustration of the image of FIG. 3 after the region-wise normalization cut and/or the region-wise min cut have been performed.
Figure 6:
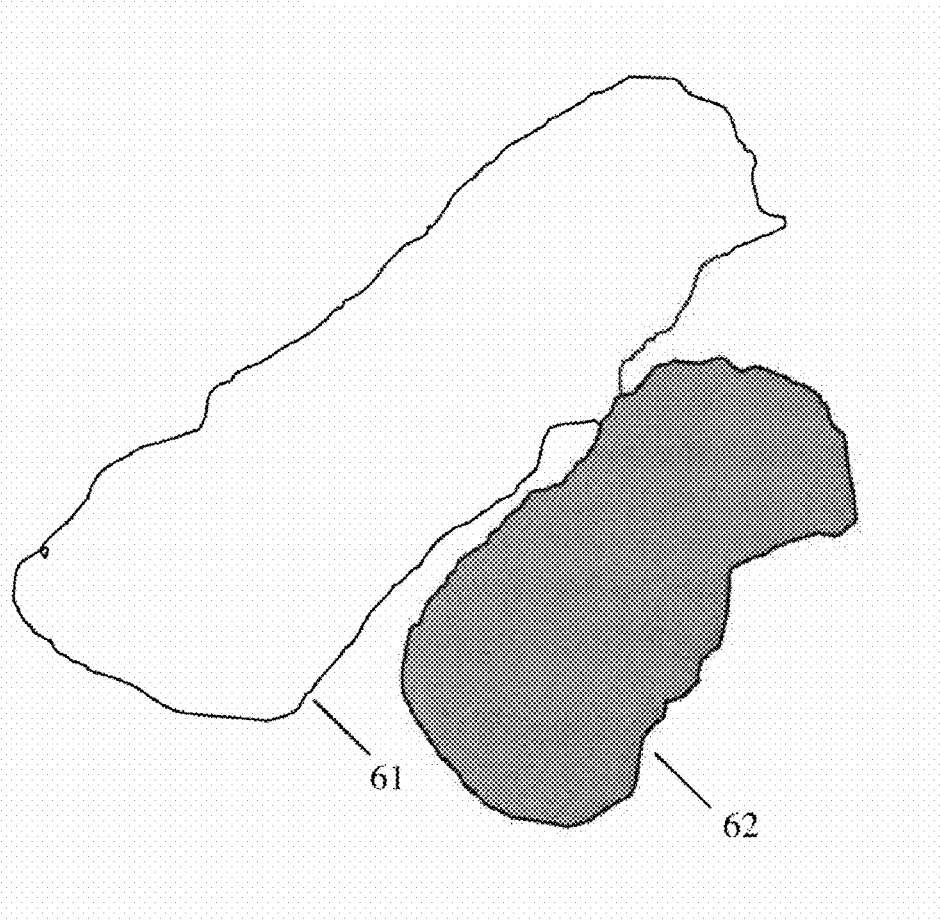
FIG. 6 is an illustration of the image of FIG. 3 after the voxel-wise min cut.

FIG. 5 is an illustration of the image of FIG. 3 after the region-wise normalization cut (Step S22) and/or the region-wise min cut (Step S23) have been performed. Here rough segmentation has been performed to divide the structure into a structure of interest 52 and a region of leakage 51. Actual leakage 53 may be seen in the segmentation, however, as shown, the leakage 53 is contained within the set of fifth marching regions 45 of FIG. 4. Thus the voxel-wise min cut step (S24) may be performed solely within the set of fifth marching regions 45. Finally, FIG. 6 is an illustration of the image of FIG. 3 after the voxel-wise min cut (Step S24). Here the leakage has been resolved and the structure has been segmented into the structure of interest 62 and a surrounding area 61.

Figure 7:
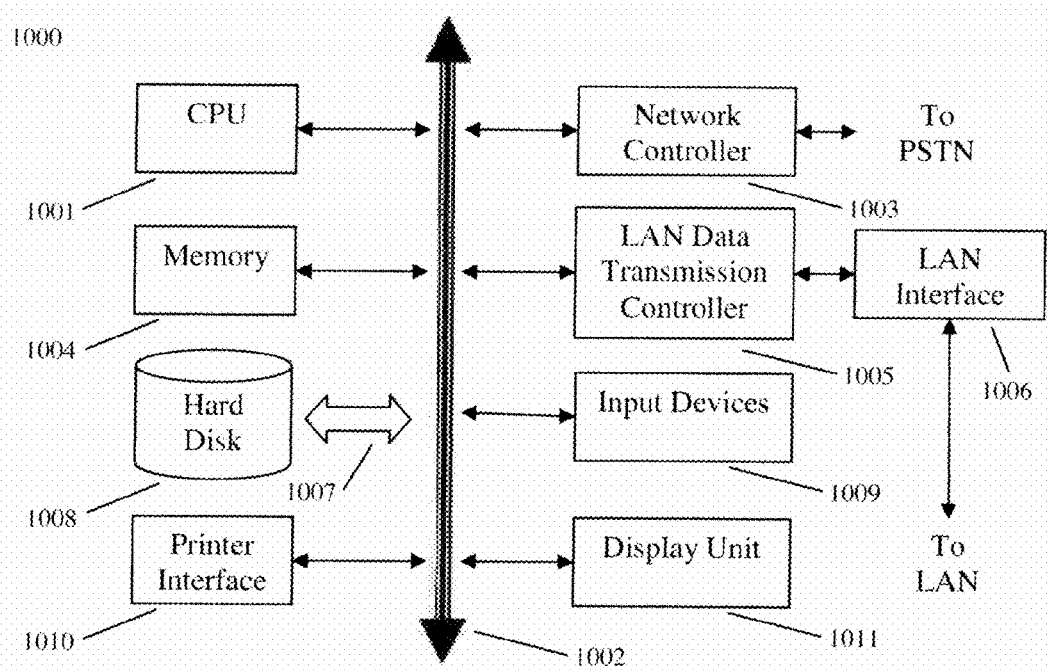
FIG. 7 shows an example of a computer system capable of implementing the method and apparatus according to embodiments of the present disclosure.

FIG. 7 shows an example of a computer system which may implement a method and system of the present disclosure.

The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk, 1008 via a link 1007.

Exemplary embodiments described herein are illustrative, and many variations can be introduced without departing from the spirit of the disclosure or from the scope of the appended claims. For example, elements and/or features of different exemplary embodiments may be combined with each other and/or substituted for each other within the scope of this disclosure and appended claims.

What is claimed is:

1. A method for segmenting image data, comprising:
   creating a plurality of marching regions within the medical image data;
   performing region-wise segmentation on the plurality of marching regions; and
   performing voxel-wise segmentation on a subset of the plurality of marching regions.

2. The method of claim 1, wherein a first marching region of the plurality of marching regions is created by:
   prompting a user to identify an initial seed point;
   receiving a location of the initial seed point from the user;
   growing the first marching region from the initial seed point using a growing algorithm; and
   adding boundary points from the first marching region to a seed point candidate queue.

3. The method of claim 2, wherein an additional marching region of the plurality of marching regions is created by:
   selecting a seed point candidate from the seed point candidate queue that is not identified as part of a marching region;
   growing the additional marching region from the selected seed point candidate using a growing algorithm; and
   adding boundary points from the additional marching region to the seed point candidate queue.

4. The method of claim 1, wherein a first marching region of the plurality of marching regions is created by:
   automatically identifying an initial seed point;
   growing the first marching region from the initial seed point using a growing algorithm; and
   adding boundary points from the first marching region to a seed point candidate queue.

5. The method of claim 4, wherein an additional marching region of the plurality of marching regions is created by:
   selecting a seed point candidate from the seed point candidate queue that is not identified as part of a marching region;
   growing the additional marching region from the selected seed point candidate using a growing algorithm; and
   adding boundary points from the additional marching region to the seed point candidate queue.

6. The method of claim 4, wherein the initial seed point is automatically identified using an organ detection algorithm.

7. The method of claim 1, wherein the region-wise segmentation performed on the plurality of marching regions includes a normalized cut performed on a graph wherein each marching region represents a node.

8. The method of claim 7, wherein edges of the graph connect neighboring marching regions and thickness of the edges represent extent to which neighboring marching regions share a boundary area.

9. The method of claim 1, wherein the region-wise segmentation performed on the plurality of marching regions includes a region-wise mm cut performed on a graph wherein each marching region represents a node.

10. The method of claim 9 wherein edges of the graph connect neighboring marching regions and thickness of the edges represent extent to which neighboring marching regions share a boundary area.

11. The method of claim 9, wherein source and sink abstract nodes are added to the graph prior to performing region-wise min cut.

12. The method of claim 9, wherein the user selects at least one exterior region from the image data, a growing tree representing the manner in which the marching regions were created is consulted to ascertain the descendants of the selected exterior region and the selected regions, the descendants of the selected regions and the neighbors of the descendants are assigned a big edge weight to the source node of the graph for performing the region-wise min cut.

13. The method of claim 1, wherein the voxel-wise segmentation performed on the subset of the plurality of marching regions includes a voxel-wise min cut performed on a graph wherein each voxel represents a node.

14. The method of claim 13 wherein edges of the graph connect neighboring voxels and thickness of the edges represent extent to which neighboring voxels share a boundary area.

15. The method of claim 13, wherein the subset of the plurality of marching regions includes one or more marching regions containing segmentation leakage.

16. The method of claim 13, wherein source and sink abstract nodes are added to the graph prior to performing voxel-wise min cut.

17. A method for segmenting image data, comprising:
    creating a plurality of marching regions within the medical image data;
    performing rough segmentation by applying region-wise segmentation on the plurality of marching regions; and
    performing fine segmentation on a leakage region of the region-wise segmentation by performing a min cut.

18. The method of claim 17, wherein the region-wise segmentation performed on the plurality of marching regions includes performing a normalized cut on a graph wherein each marching region represents a node.

19. The method of claim 18, wherein edges of the graph connect neighboring marching regions and thickness of the edges represent extent to which neighboring marching regions share a boundary area.

20. The method of claim 17, wherein the region-wise segmentation performed on the plurality of marching regions includes performing a region-wise min cut on a graph wherein each marching region represents a node.

21. The method of claim 17, wherein a first marching region of the plurality of marching regions is created by:
    prompting a user to identify an initial seed point;
    receiving a location of the initial seed point from the user;
    growing the first marching region from the initial seed point using a growing algorithm; and adding boundary points from the first marching region to a seed point candidate queue.

22. The method of claim 21, wherein an additional marching region of the plurality of marching regions is created by:
selecting a seed point candidate from the seed point candidate queue that is not identified as part of a marching region;
growing the additional marching region from the selected seed point candidate using a growing algorithm; and
adding boundary points from the additional marching region to the seed point candidate queue.

23. A computer system comprising:
a processor; and
a program storage device readable by the computer system, embodying a program of instructions executable by the processor to perform method steps for segmenting image data, the method comprising:
creating a plurality of marching regions within the medical image data;
performing rough segmentation by applying region-wise segmentation on the plurality of marching regions including either a region-wise normalized cut or a region-wise min cut; and
performing fine segmentation on a leakage region of the region-wise segmentation by performing a min cut.

* * * * *